(12) United States Patent
Inaba

(10) Patent No.: US 7,671,788 B2
(45) Date of Patent: Mar. 2, 2010

(54) APPARATUS AND METHOD FOR SUPPRESSION OF UNNECESSARY SIGNALS IN A RADAR SYSTEM

(75) Inventor: Takayuki Inaba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 394 days.

(21) Appl. No.: 11/658,997

(22) PCT Filed: Aug. 2, 2004

(86) PCT No.: PCT/JP2004/011055

§ 371 (c)(1),
(2), (4) Date: Jan. 31, 2007

(87) PCT Pub. No.: WO2006/013614

PCT Pub. Date: Feb. 9, 2006

(65) Prior Publication Data

US 2009/0009381 A1     Jan. 8, 2009

(51) Int. Cl.
*G01S 13/58* (2006.01)
(52) U.S. Cl. .................................... 342/109
(58) Field of Classification Search ............... 342/109
See application file for complete search history.

(56) References Cited

U.S. PATENT DOCUMENTS

| 6,384,768 | B1 | 5/2002 | Kai et al. |
| 6,646,587 | B2 | 11/2003 | Funai et al. |
| 2009/0009381 | A1* | 1/2009 | Inaba .................. 342/109 |

FOREIGN PATENT DOCUMENTS

| DE | 102 28 583 A1 | 7/2003 |
| EP | 1777548 A1 * | 4/2007 |
| JP | 4-72588 A | 3/1992 |
| JP | 9-264944 A | 10/1997 |
| JP | 10-39002 A | 2/1998 |
| JP | 10-239422 A | 9/1998 |
| JP | 2000-171550 A | 6/2000 |
| JP | 3102224 B2 | 8/2000 |
| JP | 2001-264426 A | 9/2001 |
| JP | 2002-71793 A | 3/2002 |
| JP | 2003-194924 A | 7/2003 |
| WO | WO-99/32899 A1 | 7/1999 |

OTHER PUBLICATIONS

Translation of JP1039002.*
Translation of JP0964944.*

* cited by examiner

*Primary Examiner*—Dan Pihulic
(74) *Attorney, Agent, or Firm*—Birch, Stewart, Kolasch & Birch, LLP

(57) ABSTRACT

By pulsing transmission radio waves of continuous wave radar, clutter components included in a reception signal are suppressed.

In a radar system that emits into space pulsed transmission radio waves being generated based on a frequency-modulated reference continuous waveform, acquires a reception signal by receiving the pulsed transmission radio waves reflected from an external object, and computes distance thereto and velocity thereof from the frequency of a beat signal obtained by mixing the acquired reception signal with the reference continuous waveform, the radar system includes a frequency-band selector 19 for classifying, on the basis of a spectral spread corresponding to the pulse width of the pulsed transmission radio waves, frequency components of the beat signal, and a distance/velocity calculator 20 for computing, on the basis of the classified results from the frequency-band selector 19, relative distance to and velocity of a moving object, or relative distance to a stationary object.

7 Claims, 5 Drawing Sheets

APPARATUS AND METHOD FOR SUPPRESSION OF UNNECESSARY SIGNALS IN A RADAR SYSTEM

TECHNICAL FIELD

The present invention relates to technologies for suppressing unnecessary signals in radar system, especially to a radar technology that achieves at the same time, by combining the characteristics of pulse radars with those of continuous wave radars, resolution characterized by continuous wave radars and unnecessary-signal suppression characterized by pulse radars.

BACKGROUND ART

To avoid collision while driving, a vehicle cruise control system or a driver assistant system has been studied to put into commercial use. In such systems to avoid collision, automotive radar technologies play an important role that detects relative velocity of and distance to obstacles. In automotive radars, it is demanded that they can easily be mounted at low cost, and is also demanded that they apply systems capable of detecting, with sufficient resolution, distance to and velocity of obstacles.

As for automotive radar systems, such as pulse radar, pulse-compression radar (spread spectrum radar), frequency-modulated continuous wave radar (also referred as FMCW radar), and 2-frequency CW radar (CW: continuous wave), have been known. The pulse radar system transmits short pulses by which sufficient distance resolution can be obtained. The pulse-compression radar transmits a broadband signal with a broad pulse-width by spectral spread and obtains a specific distance resolution by compression (inverse spread spectrum). The pulse radar and the pulse-compression radar need a band of 150 MHz in order to obtain a distance resolution of 1 m and also need high-speed signal processing because of heavy correlational computation load, therefore those systems are disadvantageous to automotive radars that are required to be easily mounted at low cost.

Meanwhile, the FMCW radar system and the 2-frequency CW radar system can achieve a distance resolution of some 1 m with a receiver band of several dozen kHz, therefore they are expected to be widely applied hereafter to automotive radars. However, because continuous waves are used in those systems, reception signals include waves that have been reflected from moving objects and stationary ones at any distance away. Consequently, when a lot of heavy clutter is included, those systems have a problem in that they easily fail to estimate distance to and velocity of target objects.

In order to solve the problems above, a technology has been proposed, in which a beat signal during a frequency-ascending period and a frequency-descending period is spectrally analyzed in the FMCW radar systems, and when the frequency difference between a pair of spectrum peaks becomes a predetermined value, these spectrum peaks are determined as the waves reflected from stationary objects (clutter), so as to be removed (as described in Patent Document 1).

Also, as for a method of detecting distance to stationary objects and moving objects in the 2-frequency CW systems, a technology has been proposed, in which a slope period during which two frequencies vary is provided in a portion where the two frequencies alternate with each other (as described in Patent Document 2).

Patent Documentation 1

Japanese Patent No. 3102224

Patent Documentation 2

Japanese Patent Laid-Open No. 2002-071793

DISCLOSURE OF INVENTION

Problems with those systems will be described below. In the system according to Patent Document 1, when multiple objects exists in a specified detection zone, observed frequencies from moving objects become identical to a clutter spectrum, depending on combinations of distance to and velocity of the objects, which causes a problem in that it is difficult to stably suppress the clutter spectrum. Therefore, as long as continuous waves are assumed, it is difficult to circumvent the problem in that separation of true objects from the clutter is difficult.

The system according to Patent Document 2 has a feature in that a slope period, during which frequencies change, is provided within part of periods for transmitting radio waves of two frequencies; however a problem has been that complicated circuits for transmitting are needed in order to generate waveforms for such transmission waves. In addition, unless there is a sufficient difference between the two frequencies in the 2-frequency CW system, a problem has also been that the difference causes in principle ambiguity in distance due to aliasing error. Automotive radars are required to have a maximum detectable range of some 150 m. To curb the ambiguity in distance as well as achieve such a maximum detectable range, the two frequencies become necessary to be selected such that their frequency difference is within 1 MHz. As a result, sufficient sweep width cannot be secured; therefore, it becomes difficult to stably separate objects from each other.

The present invention aims to solve the above-described problems, and propose a radar system that has characteristics of easy suppression of clutter attributed to pulse radar systems, while maintaining, by pulsing continuous waves, characteristics of high resolution attributed to continuous wave radar systems.

A radar system according to the present invention emits into space pulsed transmission radio waves generated based on a frequency-modulated reference continuous waveform, acquires a reception signal by receiving the pulsed transmission radio waves reflected from an external object, and computes distance thereto and velocity thereof from the frequency of a beat signal obtained by mixing the acquired reception signal with the reference continuous waveform, the radar system includes a frequency-band selecting means for classifying on the basis of a spectral spread corresponding to the pulse width of the pulsed transmission radio waves components of the beat signal, and a distance/velocity computing means for computing, on the basis of the classification results from the frequency-band selecting means, at least one of relative distance to and velocity of a moving object reflecting the pulsed transmission radio waves, and relative distance to a stationary object reflecting the pulsed radio waves.

Here, the continuous waves in this description may be one of the FMCW, the 2-frequency CW and the stepped chirp continuous waves. Radar systems, whichever continuous waves are used, can achieve at the same time high resolution and suppression of unnecessary waves by adopting features of the present invention.

Because a radar system according to the present invention classifies on the basis of the spectral spread corresponding to the pulse width frequency components of the beat signal, the radar system can effectively select, among frequency components of the beat signal containing clutter, frequency components corresponding to external moving objects so as to preserve sufficient resolution of the continuous wave radar systems. Therefore, the radar system can curb erroneous detection of external objects so as to enhance the reliability of its measurements.

"18" is a frequency analyzer; "19," a frequency-band selector; "20," a distance/velocity detector; "21," a HPF; "22," an adaptive filter; "23," a super-resolution spectrum estimator.

BEST MODE FOR CARRYING OUT THE INVENTION

Embodiment 1

Figure 1:
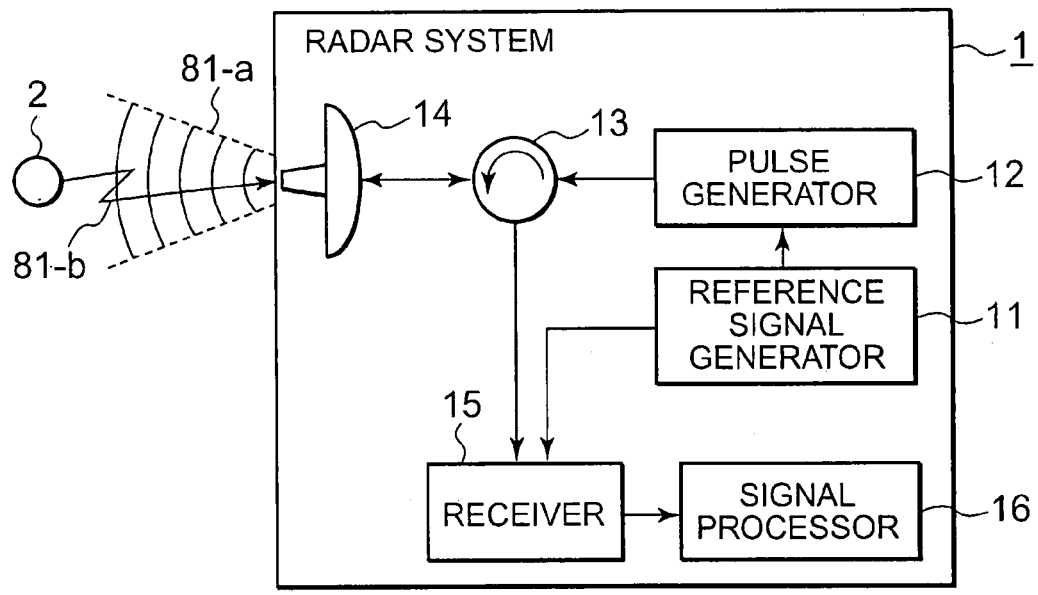
FIG. 1 is a configurational block diagram illustrating a radar system according to Embodiment 1 of the present invention.

FIG. 1 is a configurational block diagram illustrating a radar system according to Embodiment 1 of the present invention. A radar system 1 in the diagram is a radar system mounted on a moving object (also referred as a moving platform) that moves at a velocity of $v_0$; and includes a reference signal generator 11, a pulsing device 12, a circulator 13, an antenna 14, a receiver 15, and a signal processor 16. The reference signal generator 11 is a circuit or an elemental device that generates a reference signal having a predetermined continuous waveform. The frequency of the reference signal generated by the reference signal generator 11 repeats in a certain cycle to continuously ascend and descend. A radar system, using such frequency-modulated waves, that measures relative distance to and relative velocity of an external object has been known as a FMCW radar system.

The pulse generator 12 is a circuit or an elemental device that transforms into a pulsed signal having predetermined pulse widths the reference signal generated by the reference signal generator 11. Here, it is assumed that the predetermined pulse width is $T_p$. The circulator 13 is a circuit or an elemental device in which the antenna 14's connection is switched, in a predetermined cycle, between the pulse generator 12 and the receiver 15. Consequently, the antenna 14 operates, by the circulator 13, as a transmitting antenna when being connected to the pulse generator 12 and as a receiving antenna when being connected to the receiver 15.

Although the radar system 1 includes the antenna 14 shared by transmitting/receiving functions in order to be configured simply, it should be understood that a configuration including independently a transmitting antenna and a receiving one may be adopted. Also in that case, a component such as the circulator 13 becomes unnecessary.

The antenna 14 emits, as transmission radio waves 81-$a$, to an external object 2 the pulsed signal generated by the pulse generator 12.

As a result, the transmission radio waves 81-$a$ are reflected by the external object 2, then arrive back at the antenna 14 as reflection radio waves 81-$b$.

The receiver 15 is a circuit or an elemental device, in which the receiver 15 performs a detecting process of a reception signal obtained from the reflection radio waves 81-$b$ received by the antenna 14, transforms into a digital signal at sampling intervals $T_k$ the detected signal, and mixes with the digitized reception signal the reference signal outputted from the reference signal generator 11 so as to generate a beat signal.

Figure 2:
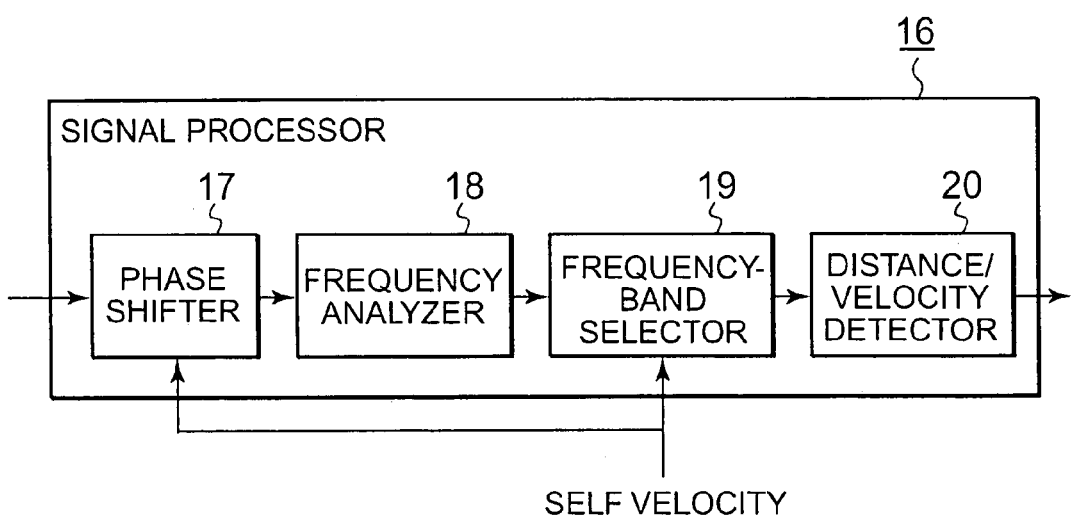
FIG. 2 is a detailed configurational block diagram illustrating the radar system according to Embodiment 1 of the present invention.

The signal processor 16 is a circuit or an elemental device that detects on the basis of the beat signal generated by the receiver 15 relative distance to and relative velocity of the external object 2. FIG. 2 is a detailed configurational block diagram illustrating the signal processor 16. In the figure, a phase shifter 17 is a circuit or an elemental device that adjusts on the basis of self velocity obtained by a self-velocity sensor, not illustrated in the figure, the phase of the beat signal in order to make the signal be processed thereafter without difficulty.

A frequency analyzer 18 is a circuit or an elemental device that performs-frequency analysis by performing a fast Fourier transform (referred as 'FFT' hereinafter) of the signal outputted from the phase-rotation compensator 17.

A frequency-band selector 19 is a circuit or an elemental device that classifies, on the basis of the self velocity, into frequency components corresponding to external objects that move and frequency components corresponding to external objects that remain stationary, the frequencies of the beat signal obtained by the frequency analyzer 18.

Figure 3:
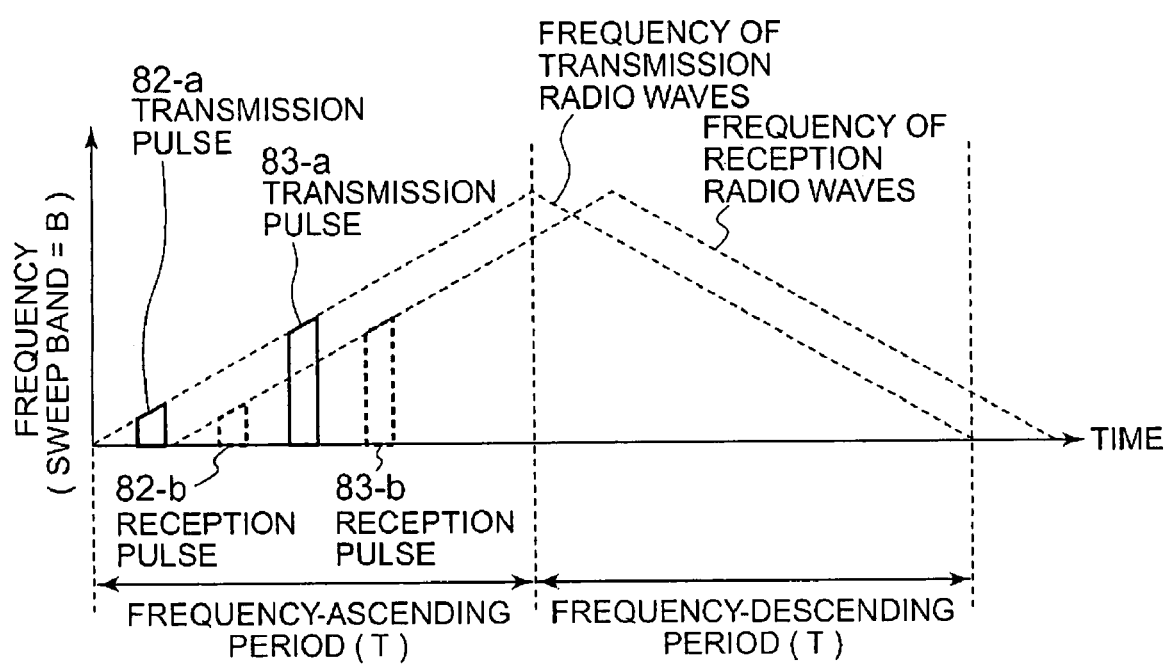
FIG. 3 is a diagram illustrating waveforms of pulses that the radar system according to Embodiment 1 of the present invention transmits/receives.

Next, the operations of the radar system 1 will be explained. In FIG. 3, it is illustrated that the frequency of the continuous waves generated by the reference signal generator 11 and frequencies of transmission/reception pulses are changing with time. In the figure, the broken lines shown as the frequency of the transmission radio waves are the frequency of the continuous waves generated by the reference signal generator 11. As shown in the figure, the reference signal generator 11 generates linear FM waves whose frequency ascends in a predetermined period and then descends in the same period. The period in which the frequency thereof ascends is referred as a frequency-ascending period or an up-chirp. Also, the period in which the frequency thereof descends is referred as a frequency-descending period or a down-chirp. A time length, such as the frequency-ascending period or the frequency-descending period, is referred as a sweep time and will be expressed hereinafter as T. In addition, the difference between an upper/lower limit of the frequency thereof is referred as a sweep band and will be expressed as B. Given that a transmission frequency is f and an FM slope is μ (=B/T), the amplitude of transmission signal $T_{up}(t)$ that the reference signal generator 11 generates during the frequency-ascending period is expressed as follows.

Formula 1.

$$T_{up}(t) = \cos\left\{2\pi\left(f + \frac{1}{2}\mu t\right)t\right\} \quad (1)$$

With reference to an envelope in Formula 1, it is assumed to be one for the sake of simplicity. In automotive radars, it is determined, in most cases, that the transmission frequency f is 76.5 GHz and the sweep band B is approximately 100 MHz.

In this connection, a pair of periods consisting of a single frequency-ascending one and a single frequency-descending one, is referred generally to as a burst. Although one single burst is illustrated in the figure, the reference signal generator 11 actually generates repeatedly a reference signal that has a plurality of bursts.

The pulse generator 12 cuts out part of the continuous waves generated by the reference signal generator 11 as transmission pulses each having a pulse width of $T_p$ so as to generate such a transmission pulse 82-$a$ and a transmission pulse 83-$a$ shown in the figure. Then, the transmission pulses 82-$a$ and 83-$a$ are emitted through the circulator 13 from the antenna 14 into space as the transmission radio waves 81-$a$. The external object 2 partially reflects those pulses, and then the reflected radio waves arrive at the antenna 14 as reception pulses 82-$b$ and 83-$b$. The reception pulse 82-$b$ is the reflection of the transmission pulse 82-$a$, and the reception pulse 83-$b$ is that of the transmission pulse 83-$a$.

In the figure, the broken lines indicated as reception frequency represent the frequency of reception radio waves, in which the transmission radio waves expressed in Formula 1 are reflected by the external object 2 and then arrive at the antenna 14 as the reflection radio waves. Due to distance to and relative velocity of the external object 2, the reception radio waves corresponding to the transmission radio waves expressed in Formula 1 undergo effects of time delay and Doppler shift, so as to be expressed as follows.

Formula 2.

$$R_{up}(t) = \cos\left\{2\pi\left(f + \frac{1}{2}\mu\left(t - \tau - \frac{2v}{c}t\right)\right)\left(t - \tau - \frac{2v}{c}t\right)\right\} \quad (2)$$

In Formula 2, it is also assumed that the envelope is one, v is a relative velocity of the external object 2, c is the velocity of light, and τ is a term of time delay, which, given that R is a relative distance to the external object 2, can be calculated as below.

Formula 3.

$$\tau = \frac{2R}{c} \quad (3)$$

Figure 4:
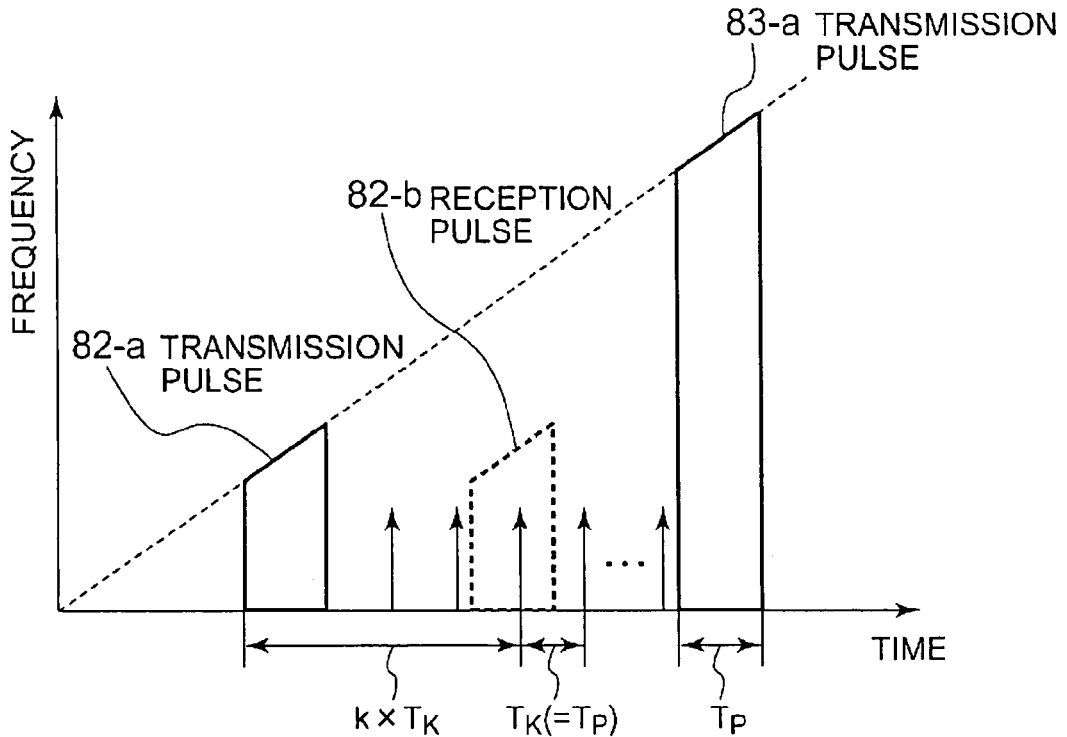
FIG. 4 is an explanatory diagram for explaining the relationship between the transmission/reception pulses by the radar system according to Embodiment 1 of the present invention and sampling intervals thereof.

The receiver 15 samples at sampling intervals $T_k$ the reception pulses. FIG. 4 is a diagram for explaining in the radar system 1 the relationship between the pulse width $T_p$ of the transmission/reception pulses and the sampling intervals $T_k$. For the sake of simplicity, it is assumed that the sampling intervals $T_k$ and the pulse width $T_p$ have the same time length. As is shown in the figure, given that the received pulse 82-$b$ corresponding to the transmission pulse 82-$a$ is received at the k-th sampling after transmitting the transmission pulse 82-$a$, a distance R(k) to the external object 2 can be expressed as follows.

Formula 4.

$$R(k) = \frac{c \cdot kT_p}{2} \quad (4)$$

Therefore, given that a precise distance to the external object 2 is R, when the pulse width $T_p$ is taken into account, the relationship between R and R(k) in Formula 5 holds true.

Formula 5.

$$R(k) - \frac{c \cdot T_p}{2} < R < R(k) + \frac{c \cdot T_p}{2} \quad (5)$$

Generally, in FMCW radar systems using continuous waves, the reception radio waves expressed in Formula 2 are mixed with the transmission radio waves expressed in Formula 1 and then filtered by an LPF (low pass filter), so that a beat signal is obtained in a form expressed approximately in Formula 6. In the formula, λ is the wavelength of the transmission radio waves.

Formula 6.

$$B_{up}(t) \cong \cos\left(2\pi\left(-\frac{2B}{cT}R - \frac{2}{\lambda}v\right)t\right) \quad (6)$$

In addition, the receiver 15 mixes also the imaginary part of the reception signal, so that a complex beat signal $B_{up}(t)$ in Formula 7 is obtained during the frequency-ascending period.

Formula 7.

$$B_{up}(t) = \exp\left\{j\left[2\pi\left(-\frac{2B}{cT}R - \frac{2}{\lambda}v\right)t\right]\right\} \quad (7)$$

In a similar fashion, the receiver 15 obtains a complex beat signal $B_{down}(t)$ in Formula 8 during the frequency-descending period.

Formula 8.

$$B_{down}(t) = \exp\left\{j\left[2\pi\left(\frac{2B}{cT}R - \frac{2}{\lambda}v\right)t\right]\right\} \quad (8)$$

As is apparently derived from Formula 7 and Formula 8, the frequency of the beat signal is determined by the distance R to and the relative velocity v of the external object 2. Therefore, as far as the frequencies, $B_{up}(t)$ and $B_{down}(t)$, of the beat signal are obtained, the distance R to and the relative velocity v of the external object 2 can be obtained by solving the simultaneous equations of Formula 7 and Formula 8. Up to this point, the principles of FMCW radar systems have been described.

Next, another application of FMCW waves will be explained in which the transmission radio waves thereof are pulsed. A receiver 15 generates also from pulsed reception radio waves a beat signal in a fashion similar to FMCW radars described above. For easy understanding of explanations, it is assumed that the external object 2 exists solely as external objects of interest and relative distance to and velocity of the object 2 are $R_{tgt}$ and $v_{tgt}$, respectively. In addition, it is also assumed that the number of other reflecting objects that reflect radio waves is I (I is a natural number), and relative distance to and relative velocity of each of the reflecting objects are expressed as $Rc_i$ and $vc_i$ respectively. Furthermore, as has been described at the beginning of Embodiment 1, it is also taken into account that the velocity of the radar system 1 is $v_0$. Then, when sampling operations have been performed during a frequency-ascending period within a certain sweep time, the sampled data (beat signal) $B_{up}(k,n)$ obtained at the k-th sampling after transmitting the n-th pulse, is expressed as follows.

Formula 9.

$$B_{up}(k, n) = \exp\left\{2\pi j\left(-\frac{2B}{cT}R_{tgt} - \frac{2}{\lambda}(v_{tgt} - v_0)\right)(kT_p + nT_s)\right\} + \sum_{i=1}^{I} \sigma_i \exp\left\{2\pi j\left(-\frac{2B}{cT}Rc_i - \frac{2}{\lambda}(vc_i - v_0)\right)(kT_p + nT_s)\right\} \quad (9)$$

In Formula 9, the first term thereof expresses reflected radio waves reflected from the moving object that is at a distance of $R_{tgt}$ and a relative velocity of $v'=v_{tgt}-v_0$. Also, the second term thereof corresponds to radio waves reflected from other reflecting objects, so that the term can be considered as clutter. Therefore, $\sigma_i$ expresses the complex amplitude of each reflected radio waves in the clutter. As is shown apparently from the second term in Formula 9, a clutter frequency $f_c$ can be expressed as follows.

Formula 10.

$$fc = \left( = \frac{2B}{cT}Rc_i - \frac{2}{\lambda}(vc_i - v_0)\right) \quad (10)$$

The reflecting objects generating the clutter can be considered approximately stationary, leading to $vc_i \approx 0$. Also because distances to objects obtained at that sampling are restricted by Formula 5, the spectral spread can be limited. Meanwhile, as far as cases of automotive radars, for example, are concerned, the external object 2 is likely to be another vehicle and, in most cases, is moving at some velocity. Therefore, when a moving object moving at a relative velocity beyond the spectral spread of the clutter is included, the moving object can be separated from the clutter (stationary objects) by frequency-filtering operations.

Thus, frequency-filtering operations are performed next by the signal processor 16. In order to perform the operations, the signal processor 16 obtains at first the complex beat signal generated by the receiver 15. Then, the phase shifter 17 adjusts the phase of the beat signal so that the frequency at the spectrum center of the spectral clutter becomes approximately zero. As shown in Formula 11, the way of adjusting the phase becomes dependent on a time-delayed sampling number k and a relative velocity $-v_0$.

Formula 11.

$$Y_{up}(k, n) = B_{up}(k, n)\exp\left\{2\pi j\left(\frac{2B}{cT}R(k) - \frac{2}{\lambda}(v_0)\right)(nT_s)\right\} \quad (11)$$

Next, the frequency analyzer 18 performs a spectral analysis by performing a fast Fourier transform (FFT) of the phase-adjusted beat signal $Y_{up}(k,n)$, as shown in Formula 12.

Formula 12.

$$F_{up}(k, m) = \sum_{n=0}^{N-1} Y(k, n)\exp\{-2\pi j(n/N)m\} \quad (12)$$

In Formula 12, N is the number of pulses that are transmitted within the sweep time T and m is the order of a frequency-spectral component.

Output channels of the FFT operation are classified into the channels satisfying Formula 13 and the rest of them by the frequency-band selector 19.

Formula 13.

$$-\delta f \leq m/T_s N \leq \delta f \quad (13)$$

The channels satisfying Formula 13 are output channels that provably form a clutter spectrum. Hereinafter, such output channels each will be referred as a band stop channel (BSC). Also, the rest of them are the channels that do not include the clutter, therefore each of the channels will be referred as a clutter free channel (CFC).

Next, a method of determining $\delta f$ in Formula 13 will be explained below. $\delta f$ is a spectral spread of the clutter in frequency, and can be calculated, as shown in Formula 14, by combining a Doppler-frequency spread $\delta f_{angle}$ depending on an angle with a spread $\delta f_{angle}$ caused by distance error.

Formula 14.

$$\delta f = \sqrt{\delta f_{range}^2 + \delta f_{angle}^2} \quad (14)$$

As apparently derived from Formula 5, the error between the true distance $R_c$ to a reflecting object causing clutter and a sampling distance $R(k)$ are considered to have uniformly distributed error within a width given below.

Formula 15.

$$\delta R = Rc - R(k) = \pm T_p/2 \quad (15)$$

Here, the distance error $\delta f_{range}$ is calculated by the formula given below, using the uniformly distributed error $\delta R$ obtained from Formula 15.

Formula 16.

$$\delta f_{range} = \frac{2B}{cT}\delta R = \pm \frac{BT_p}{T} \quad (16)$$

Assuming that the antenna 14 is pointed to a platform moving direction (when the antenna 14 is an array antenna, the direction is its array-normal-direction), relative velocity of a reflecting object generating clutter reaches a maximum value when the object exists in the direction to which the platform moves, and the larger becomes the angle between the direction of the antenna 14 and that of the object, the smaller becomes the relative velocity of the reflecting object generating the clutter. At this moment, a Doppler frequency-difference $\Delta f_{angle}$ in the direction that forms a transmitting angle θ with respect to the direction of antenna 14 is given as follows.

Formula 17.

$$\Delta f_{angle} = 2v_0(1-\cos(\theta))/\lambda \quad (17)$$

Therefore, the Doppler frequency spread $\delta f_{angle}$ can be considered to be uniformly distributed as given by the formula below.

Formula 18.

$$\delta f_{angle} = \pm \frac{1}{2} \cdot \Delta f_{angle} \qquad (18)$$

In addition, when the antenna 14 is such an antenna as has a narrow beam, $\delta f_{angle}$ can be considered to be negligibly small compared with $\delta f_{range}$, so that the term of $\delta f_{angle}$ may be eliminated in Formula 14.

Finally, a distance/velocity detector 20 searches the CFCs for a peak value of absolute spectrum F(k,m). Assuming that a spectrum in the frequency-ascending period and a spectrum in the frequency-descending period are $F_{up}$(k,m) and $F_{down}$(k,m) respectively, and that the peak value of the absolute $F_{up}$(k,m) and that of the absolute $F_{down}$(k,m) are $f_{CFC,up}$ and $f_{CFC,down}$ respectively, a relative distance $R_{tgt}$ to and a relative velocity $v_{tgt}$ of the external object 2 are expressed form in Formula 7 and Formula 8, as follows.

Formula 19.

$$R_{tgt} = R(k) + \frac{cT}{4B}(-f_{CFC,up} + f_{CFC,down}) \qquad (19)$$

Formula 20.

$$v_{tgt} = -\frac{\lambda}{4}(-f_{CFC,up} - f_{CFC,down}) \qquad (20)$$

In a similar fashion, in order to detect a distance to a stationary object, $f_{CFC,up}$ and $f_{CFC,down}$ are only replaced in Formula 19 and Formula 20 with values of $f_{BSC,up}$ and $f_{BSC,down}$ that are peak frequency values during the frequency-ascending period and the frequency-descending period in the BSCs respectively.

As is evident from the above, because a radar system according to Embodiment 1 of the present invention divides into bands output channels of an FFT applied to a beat signal, the probability of false detection of distance to and velocity of an object can be reduced.

In addition, although the phase shifter 17 in the radar system 1 adjusts the phase of a beat signal, such operations performed in the shifter may be replaced by selecting as a BSC a channel that has the center frequency dependent on a time-delayed sampling number, so that the shifter 17 can be eliminated. Also, although a fast Fourier transform, being best known as a spectral analysis method, has been applied to the above-described radar system, other methods may be applied.

Embodiment 2

In Embodiment 2 according to the present invention, it will be explained that 2-frequency CW radar systems can also suppress unnecessary radio waves by dividing into bands output channels from FFT operations of beat frequencies.

The configuration of a radar system according to Embodiment 2 of the present invention is also illustrated by the block diagram of FIG. 1, in the same way as Embodiment 1. However, Embodiment 2 according to the invention differs from Embodiment 1 in the configuration of the signal processor 16.

Figure 5:
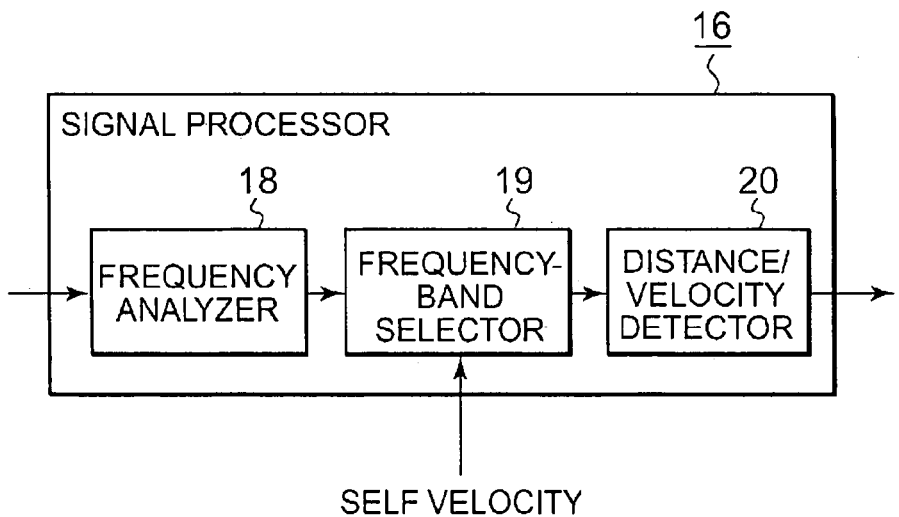
FIG. 5 is a detailed configurational block diagram illustrating a radar system according to Embodiment 2 of the present invention.

FIG. 5 is a configurational block diagram illustrating such a signal processor 16 according to Embodiment 2 of the present invention. As is apparent from its comparison with the configuration, illustrated in FIG. 2, of the signal processor in Embodiment 1, the signal processor 16 according to Embodiment 2 of the present invention has a feature in that the phase shifter 17 has been eliminated.

Figure 6:
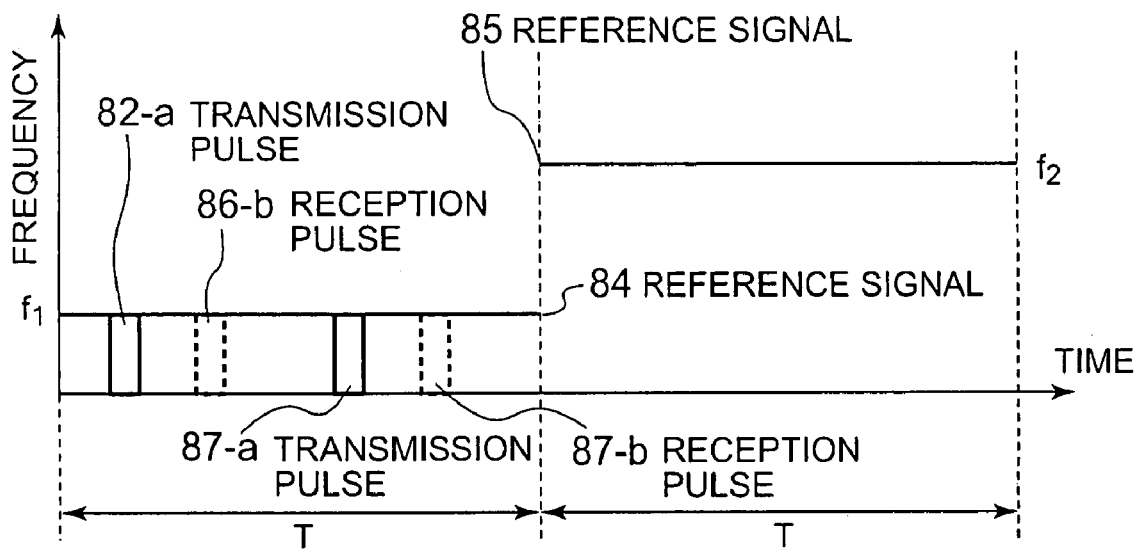
FIG. 6 is a diagram illustrating waveforms of pulses that the radar system according to Embodiment 2 of the present invention transmits/receives.

Next, the operation of the radar system 1 according to Embodiment 2 of the present invention will be explained. FIG. 6 is a diagram illustrating a time sequence, in the radar system 1 according to Embodiment 2 of the present invention, with respect to reference signals generated by the reference signal generator 11, pulses generated by the pulse generator 12, and reception pulses received by the antenna 14. As is shown in the figure, the reference signal generator 11 generates during a period of T a reference signal 84 of a frequency f1 followed by generating during the period of T a reference signal 85 of a frequency f2. Then the reference signal generator 11 repeats a plurality of bursts each duration of which consists, as a single burst, of the reference signal 84 and the reference signal 85.

The pulse generator 12 pulses the reference signal 84 and the reference signal 85 so as to generate transmission signals. The generated transmission signals are emitted from the antenna 14 into space via the circulator 13. The reflected radio waves from the external object 2 and reflecting objects, being stationary, reach the antenna 14, while the radio waves are accompanied with time delays depending on distance to these reflecting objects and frequency variations due to Doppler effects depending on their relative velocities. Those reception signals are inputted into the receiver 15 via the circulator 13. The receiver 15 performs, during receiving a signal of the frequency f1, IQ-mixing of the reception signal with the reference signal (local signal) of the frequency f1 generated by the reference signal generator 11, and performs LPF-processing thereof, so that an output signal $B_{f1}$ can be obtained in Formula 21 shown below.

Formula 21.

$$B_{f1}(n) = \exp\left\{-j\left[2\pi\left(\frac{2}{\lambda}vT_sn\frac{2f_1}{c}R\right)\right]\right\} \qquad (21)$$

In a similar fashion, the receiver 15 performs, during receiving a signal of the frequency f2, IQ-mixing of the received signal with the reference signal (local signal) of the frequency f2 generated by the reference signal generator 11 and performs LPF-processing thereof, so that an output signal $B_{f2}$ can be obtained in Formula 22 shown below.

Formula 22.

$$B_{f2}(n) = \exp\left\{-j\left[2\pi\left(\frac{2}{\lambda}vT_sn + \frac{2f_2}{c}R\right)\right]\right\} \qquad (22)$$

Here, it is assumed for the sake of simplicity that the envelopes in Formula 21 and Formula 22 are one, $\lambda$ is a wavelength of the transmission radio waves, $T_s$ is a pulse width, n is the sequential number that corresponds to the n-th pulse transmitted, v is a relative velocity of the external object 2, R is distance to the same, and c is the velocity of light.

The output signals $B_{f1}$, $B_{f2}$ are inputted into the signal processor 16. As is apparently shown from Formula 21 and Formula 22, they demonstrate that the same object results in the same Doppler-frequency in both periods of the frequency f1 and the frequency f2. Therefore, a spectral analysis is performed on sampled data during each of the periods of the frequency $f_1$ and the frequency $f_2$ to find a peak value, then the velocity of the external object 2 can be obtained from a frequency that gives the peak value, also the distance to the external object 2 can be calculated, as shown in the formula given below, with a phase difference $\Delta\phi$ between frequency components of the received signals.

Formula 23.

$$R = \frac{c\Delta\varphi}{4\pi(f_2 - f_1)} \tag{23}$$

The operations of the frequency-band selector 19 are almost similar to those in Embodiment 1. However, in this 2-frequency CW system, time delay does not cause spectral spread, so that a clutter spread of reflecting radio waves from a stationary object can be determined by $\delta f_{angle}$. The distance/velocity detector 20 obtains velocity of the object from a frequency at which absolute values of the same frequency channel among CFCs classified by the frequency-band selector 19 take peak values during both the frequency f1 and frequency f2 periods. Also, distance to the object can be obtained from a phase difference between those frequencies by Formula 20.

As has been described, according to Embodiment 2 of the present invention, it is possible, even in the 2-frequency CW systems, to classify frequency components, on the basis of spread spectral, into moving objects and stationary objects.

Embodiment 3

Next, as another aspect of the present invention, a radar system in which an HPF (high pass filter) is used will be explained in Embodiment 3.

Figure 7:
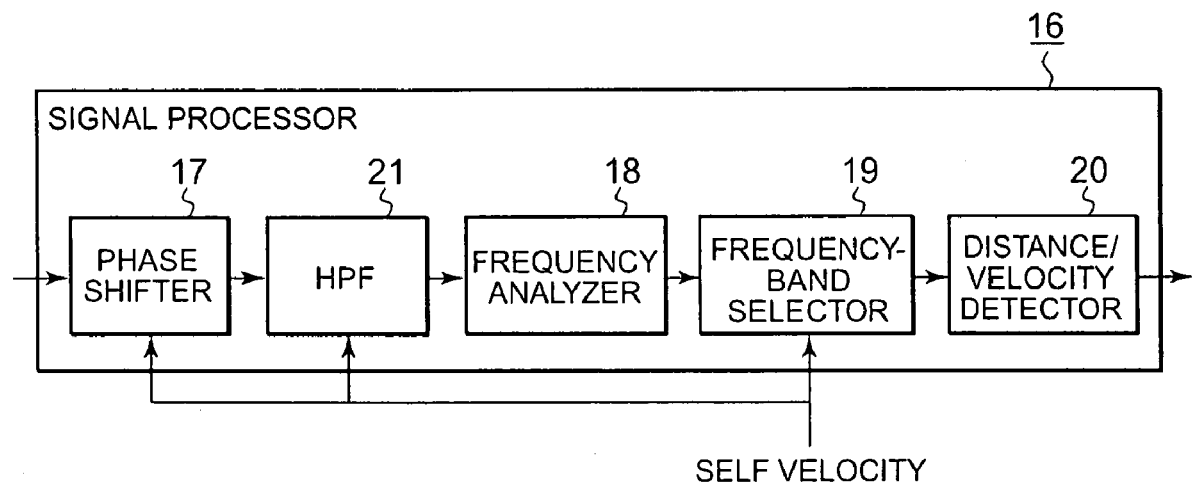
FIG. 7 is a detailed configurational block diagram illustrating a radar system according to Embodiment 3 of the present invention.

A configuration of the radar system according to Embodiment 3 of the present invention is also illustrated by the block diagram of FIG. 1, in the same way as Embodiment 1. However, Embodiment 3 according to the prevent invention differs from Embodiment 1 in the configuration of the signal processor 16. FIG. 7 is a configurational block diagram illustrating a detailed configuration of the signal processor 16 in the radar system according to Embodiment 3 of the present invention. In the figure, comparing to that of Embodiment 1, its new aspect is that an HPF (high pass filter) 21 is newly provided. Also in the radar system according to Embodiment 3, information on velocity from a self-velocity sensor, not illustrated in the figure, is inputted into the HPF 21. Since the other configurational components are the same as those in Embodiment 1, the explanations thereof will be omitted.

Next, the operation of the radar system according to Embodiment 3 of the present invention will be explained. In the radar system, the operations of the reference signal generator 11, the pulse generator 12, the circulator 13, the antenna 14, and the receiver 15, are the same as those in Embodiment 1. When a beat signal is inputted into the signal processor 16, phase rotation of the beat signal is at first compensated by the phase shifter 17 in such a way as shown in Formula 11 in order to make the signal be processed thereafter without difficulty. The HPF 21 performs HPF processing along the pulse train with respect to each time-delayed sampling number k of the phase-shift-compensated beat signal. To perform HPF processing along the pulse train with respect to each time-delayed sampling number k of the beat signal means that the HPF processing is performed with respect to the sampled value obtained at the k-th sampling operation after each of pulse 1 to pulse n has been transmitted. Given that Y(k,n) is a sampled value obtained at the k-th sampling operation after the n-th pulse has been transmitted, and Y(k,n) is abbreviated, by omitting k, to Y(n) hereinafter for the sake of simplicity, a filtered output W(n) from the HPF 21 is expressed with filter coefficients of $a_1, a_2, \ldots,$ and $a_p$ and $b_1, b_2, \ldots,$ and $b_q$, as follows.

Formula 24.

$$W(n) = a_1 W(n-1) + a_2 W(n-2) + \ldots + \\ a_p W(n-p) + b_0 Y(n) + b_1 Y(n-1) + \ldots + b_q Y(n-q) \tag{24}$$

Z-transforming Formula 24 gives a result as follows,

Formula 25.

$$W(z) = H(z)Y(z) \tag{25}$$

and the transfer function H(z) is expressed as follows.

Formula 26.

$$H(z) = \frac{b_0 + b_1 z^{-1} + \ldots + b_q z^{-q}}{a_1 + a_2 z^{-1} + \ldots + a_p z^{-p}} \tag{26}$$

It is preferable that values of the filter coefficients $a_1, a_2, \ldots,$ and $a_p$ and $b_1, b_2, \ldots,$ and $b_q$ be determined to have a cutoff frequency that blocks the range of the spectral spread given by Formula 14. The following operations are the same as those in Embodiment 1, in which the frequency analyzer 18 and the frequency-band selector 19 operate so that distance to and velocity of the external object are finally outputted through the distance/velocity detector 20.

Generally, when detecting a small moving object is tried with clutter power being high, a problem with cancellation of significant digits occurs especially in cases where an FFT is performed in fixed-point, however, because the HPF 21 that suppresses clutter power is provided as described above, before the frequency analyzer 18, the problem can be alleviated.

Embodiment 4

Next, as another aspect of the present invention, a radar system provided with an adaptive filter will be explained in Embodiment 4.

Figure 8:
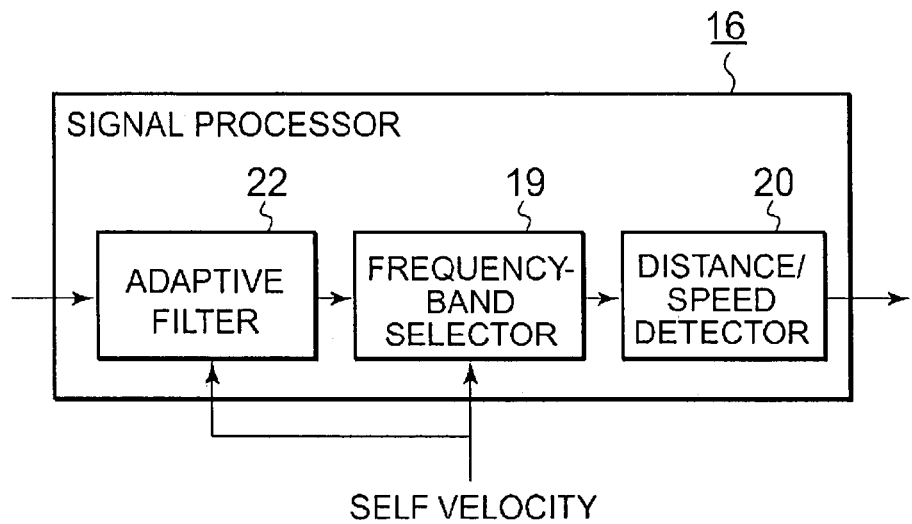
FIG. 8 is a detailed configurational block diagram illustrating a radar system according to Embodiment 4 of the present invention.

The configuration of the radar system according to Embodiment 4 of the present invention is also illustrated using the configurational block diagram of FIG. 1, in the same way as Embodiment 1. However, Embodiment 4 according to the present invention differs from Embodiment 1 in the configuration of the signal processor 16. FIG. 8 is a configurational block diagram illustrating a detailed configuration of the signal processor 16 in the radar system according to Embodiment 4 of the present invention. In the figure, comparing to that of Embodiment 1, its new aspect is that an adaptive filter 22 is newly provided instead of the phase shifter 17 and the frequency analyzer 18. Since other configurational components are the same as those in Embodiment 1 through Embodiment 3, the explanations will be omitted.

In this description, the adaptive filter 22 is referred to as an AMTI (adaptive moving target indicator), and an example of the filter is explained in 'Isao Naka and Shinkichi Nishimoto, "An Experimental Study on Ship Detection by HF Surface Wave Radar," IEICE Transactions on Communications, Vol. J82-B, No. 3, pp. 461-468, March, 1999' (hereinafter referred to as Non-patent Document 1).

Next, the operation of the radar system according to Embodiment 4 of the present invention will be explained. The operations of the reference signal generator 11, the pulse generator 12, the circulator 13, the antenna 14, and the receiver 15 are the same as those in Embodiment 1. The signal processor 16 obtains at first sampled values of the beat signal that has been outputted from the receiver 15, and performs filter-processing by the adaptive filter 22.

In general, a filter output value W(n) with respect to the n-th pulse is obtained by Formula 24: the adaptive filter 22 has a feature in that the filter coefficients of $a_1, a_2, \ldots,$ and $a_p$ and $b_1, b_2, \ldots,$ and $b_q$ are estimated from sampled data that is obtained at the k-th sampling operation, after the n-th pulse has been transmitted, and sampling data before and after the sampling operation. The k-th sampled data and the sampling data before/after the sampling, that are used in order to estimate those filter coefficients, are designated as a referring period. Here, it is assumed that only clutter exists in the referring period.

Hereinafter, explanations will be made in cases where an MSN (maximum signal to noise) filter is applied as the adaptive filter. The MSN filter is an, FIR (finite impulse response) filter that neglects, when calculating a filter value with respect to the n-the pulse, effects of the filter output values with respect to pulses except the n-th pulse. That is, in the MSN filter, $a_1, a_2, \ldots,$ and $a_p$ that are the coefficients for $W(n-1), \ldots,$ and $W(n-p)$ appearing in the right side of Formula 24, respectively, are regarded as zero. Now, it is defined that an output data vector, obtained from the receiver 15 at the k-th sampling with respect to the n-th pulse, is Y and Y is given in Formula 27.

Formula 27.

$$Y \equiv \begin{bmatrix} Y(1) \\ Y(2) \\ \vdots \\ Y(N) \end{bmatrix} \quad (27)$$

Given that the referring period is from $[k-\Delta k]$ to $[k+\Delta k]$ (where, $\Delta k$ is a natural number smaller than k) and r is a natural number satisfying $[k-\Delta k] \leq \tau \leq [k+\Delta k]$, an average of a correlation matrix R is estimated by data vectors in the referring period, as follows.

Formula 28.

$$R(k) = \langle Y(\tau) Y(\tau)^H \rangle \quad (28)$$

Here in Formula 28, 'H' is a matrix operator that performs complex conjugation and transposition, and a pair of '<' and '>' is an operator that averages data during the referring period.

Next, in a fashion similar to FFT, a steering vector V(m) is defined with respect to the m-th order frequency component, and then the V(m) is expressed as follows.

Formula 29.

$$V(m) \equiv \begin{bmatrix} \exp(2\pi j (0/N) m) \\ \exp(2\pi j (1/N) m) \\ \vdots \\ \exp(2\pi j (n/N) m) \end{bmatrix} \quad (29)$$

Then, the coefficients of the adaptive filter become $R^{-1}V(m)$, and the output W(m) from the adaptive filter with respect to the m-th frequency component can be obtained as follows.

Formula 30.

$$W(m) = (R^{-1} V(m))^H Y \quad (30)$$

In this way, an adaptive filter that performs a plurality of filtering processes to divide a predetermined band can be calculated in a fashion similar to the coefficients in FFT.

The following operations are the same as those in Embodiment 1, in which the frequency-band selector 19 classifies into a CFC and a BSC the output data from the adaptive filter 22, and the distance/velocity detector 20 calculates distance to and velocity of a moving external object, and distance to a stationary object.

By the way, although the adaptive filter in Non-patent Document 1 is applied to sweep periods of FMCW, an adaptive filter of the embodiment of the present invention is applied, in a different manner, to data sampled along the pulse train in each sweep period with FMCW continuous waves being pulsed.

As is apparent from the above, the application of an adaptive filter can also suppress, as in Embodiment 3 using an HPF, effectively clutter power.

Embodiment 5

Next, as another aspect of the present invention, a radar system that performs a super-resolution spectrum-estimating process will be explained in Embodiment 5.

Figure 9:
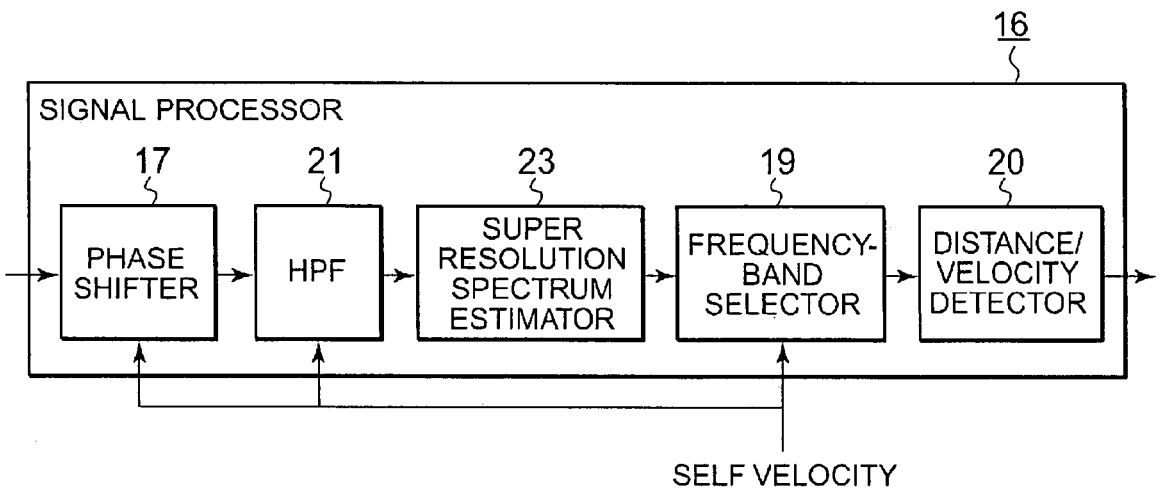
FIG. 9 is a detailed configurational block diagram illustrating a radar system according to Embodiment 5 of the present invention.

A configuration of the radar system according to Embodiment 5 of the present invention is also illustrated by the configurational block diagram of FIG. 1, in the same way as Embodiment 1 and Embodiment 3. However, Embodiment 4 according to the present invention differs from Embodiment 1 in the configuration of the signal processor 16. FIG. 9 is a configurational block diagram illustrating a detailed configuration of the signal processor 16 in the radar system according to Embodiment 5 of the present invention. In the figure, comparing to that of Embodiment 3, its new aspect is that a super-resolution spectrum-estimator 23 is provided instead of the frequency analyzer 18. Since other configurational components are the same as those in Embodiment 3, the explanations thereof will be omitted.

The super-resolution spectrum-estimator 23 is a circuit or an elemental device that performs a super-resolution spectrum-estimating process such as MUSIC (multiple signal classification), ESPRIT (estimation of signal parameters via rotational invariance technique), or maximum likelihood (ML) on sampled data obtained by k sampling operations after each pulse has been transmitted.

Hereinafter, explanations will be made when MUSIC is performed as a configurational example of the super-resolution spectrum-estimator 23. The operations of the reference signal generator 11, the pulse generator 12, the circulator 13, the antenna 14, the receiver 15, and the HPF 21 are the same as those in Embodiment 3, therefore the explanations thereof will be omitted. Here, it is assumed that a data vector inputted into the super-resolution spectrum-estimator 23 is expressed by Formula 31.

Formula 31.

$$W \equiv \begin{bmatrix} W(1) \\ W(2) \\ \vdots \\ W(N) \end{bmatrix} \quad (31)$$

First, the super-resolution spectrum-estimator 23 calculates a correlation matrix of the data vector W by Formula 32.
Formula 32.

$$R = \langle WW^H \rangle \quad (32)$$

Next, the correlation matrix R is eigenvalue-expanded. That is, N eigenvalues λ are sorted and then classified, as shown in Formula 33, into noise eigenvalues (=0) and others.
Formula 33.

$$\lambda_1 \geq \lambda_2 \geq \ldots \geq \lambda_L \geq \lambda_{L+1} - \ldots = \lambda_N = 0 \quad (33)$$

Given that eigenvectors $\phi_{L+1}, \ldots,$ and $\phi_N$ correspond to noise eigenvalues $\lambda_{L+1}, \ldots,$ and $\lambda_N$, respectively, the super-resolution spectrum-estimator 23 estimates a noise eigenspace E by Formula 34.
Formula 34.

$$E \equiv \sum_{n=L+1}^{N} \phi_n \phi_n^H \quad (34)$$

Next, a MUSIC spectrum is calculated by the evaluation function expressed in Formula 35 using the steering vector V and the noise eigenspace E.
Formula 35.

$$\text{MUSIC}(f) = \frac{V(f)^H V(f)}{V(f)^H E E^H V(f)} \quad (35)$$

The super-resolution spectrum-estimator 23 searches for peaks of the evaluation function expressed by Formula 35 so as to obtain the frequencies of the peaks.

As is shown above, a spectrum can also be obtained by MUSIC, in a way similar to that with FFT. Therefore, the frequency-band selector 19 classifies into a CFC and a BSC results that the super-resolution spectrum-estimator 23 outputs, then the distance/velocity detector 20 calculates from frequencies at which the absolute values peak, distance to and velocity of an external moving object, and distance to a stationary object.

Also when maximum likelihood (ML) is applied thereto, a spectrum can be obtained in a way similar to that by MUSIC, therefore even in a configuration where ML is used in the super-resolution spectrum-estimator 23, the frequency-band selector 19 performs the same processing.

Meanwhile, when an ESPRIT method is used, frequency values at which spectrum peak are directly obtained. Therefore, when the super-resolution spectrum-estimator 23 is configured with the ESPRIT method, the frequency-band selector 19 classifies into either a CFC or a BSC frequency values that the super-resolution spectrum-estimator 23 outputs as its results.

In this case, the HPF 21 suppresses in advance clutter that includes a lot of reflecting radio waves. Consequently, when a super-resolution spectrum-estimator method is applied, the number of the reflecting radio waves is confined to the number of the moving objects that exist within a pulse width, which brings an effect that the super-resolution spectrum-estimation method can be easily applied. Therefore, these super-resolution spectrum-estimation methods can provide a higher resolution than that by FFT. That is, when the same sweep band B is given, the super-resolution spectrum-estimation methods provide, compared to methods using FFT, an improved resolution of distance to and velocity of an object, so that the super-resolution spectrum-estimation methods can separate closer objects from each other.

INDUSTRIAL APPLICABILITY

As described, the present invention is applicable to such a radar system as a automotive one that separates a plurality of objects' positions and velocities from each other so as to measure the positions and velocities.

What is claimed is:

1. A radar system that emits pulsed transmission radio waves generated based on a frequency-modulated reference continuous waveform, acquires a reception signal by receiving the pulsed transmission radio waves reflected from an external object, and computes distance thereto and velocity thereof from the frequency of a beat signal obtained by mixing the acquired reception signal with the reference continuous waveform, the radar system comprising:
 a frequency-band selector that classifies, on the basis of a spectral spread corresponding to the pulse width of the pulsed transmission radio waves, frequency components of the beat signal;
 a distance/velocity detector that computes, on the basis of the classified results from the frequency-band selector, at least one of relative distance to and velocity of a moving object reflecting the pulsed transmission radio waves, and relative distance to a stationary object reflecting the pulsed radio waves;
 a filter that blocks out a portion of the beat signal frequency components; and
 a frequency analyzer that frequency-analyzes a portion whose frequency components have been blocked out by the filter so as to output frequency components; and
 wherein
 the frequency-band selector classifies, on the basis of spectral spread, the frequency components outputted by the frequency analyzer.

2. A radar system according to claim 1, wherein
 the frequency-band selector classifies, as a first frequency component, a frequency component that lies within the range of the spectral spread, and classifies, as a second frequency component, a frequency component that lies beyond the range of the spectral spread, and
 the distance/velocity detector performs at least either computation, on the basis of the first frequency, of relative distance to and relative velocity of the moving object, or computation, on the basis of the second frequency, of relative distance to the stationary object.

3. A radar system according to claim 1, wherein the frequency-band selector determines the range of the spectral spread on the basis of at least either spectral spread due to distance error, or spectral spread due to angular error.

4. A radar system according to claim 1, wherein the filter is a high pass filter.

5. A radar system according to claim 1, wherein the filter is an adaptive filter.

6. A radar system according to claim 1, wherein the frequency analyzer performs a super-resolution spectral estimation process.

7. A method of filtering out unwanted signals in a radar system that emits pulsed transmission radio waves generated based on a frequency-modulated reference continuous waveform, acquires a reception signal by receiving the pulsed transmission radio waves reflected from an external object, and computes distance thereto and velocity thereof from the frequency of a beat signal obtained by mixing the acquired reception signal with the reference continuous waveform, the method comprising:

classifying, on the basis of a spectral spread corresponding to the pulse width of the pulsed transmission radio waves, frequency components of the beat signal;

computing, based on the classified frequency components, at least one of relative distance to and velocity of a moving object reflecting the pulsed transmission radio waves, and relative distance to a stationary object reflecting the pulsed radio waves;

blocking out a portion of the beat signal frequency components; and frequency-analyzing the blocked-out portion, where said frequency-analyzing includes outputting frequency components; and classifying, on the basis of spectral spread, the frequency components output during said frequency-analyzing.

* * * * *